Feb. 9, 1932.  C. E. HOOVER  1,844,011
BATTERY TERMINAL
Filed Feb. 27, 1928
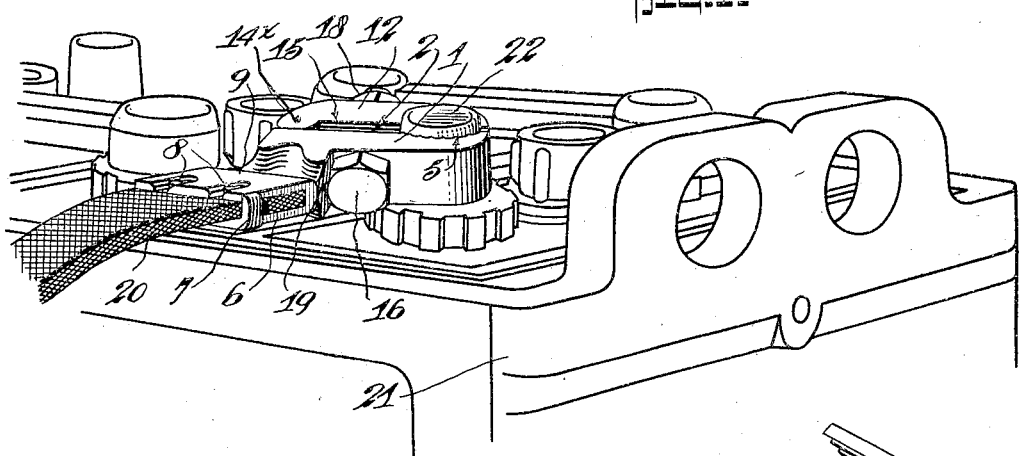
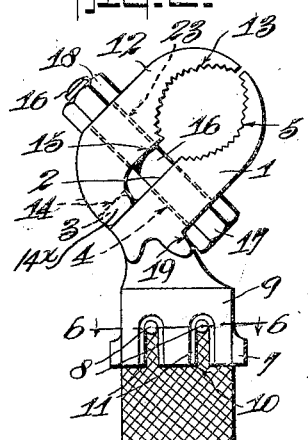
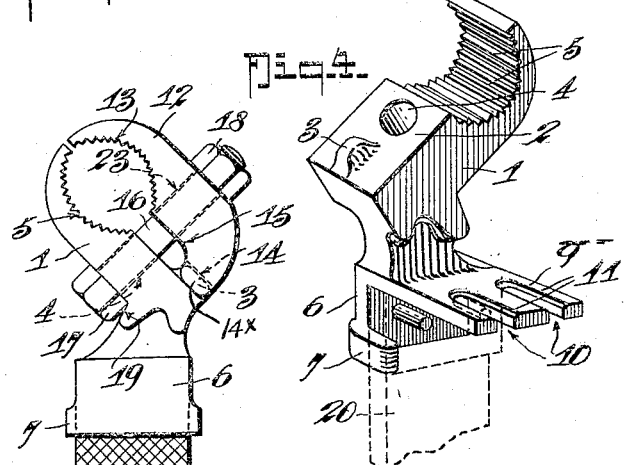
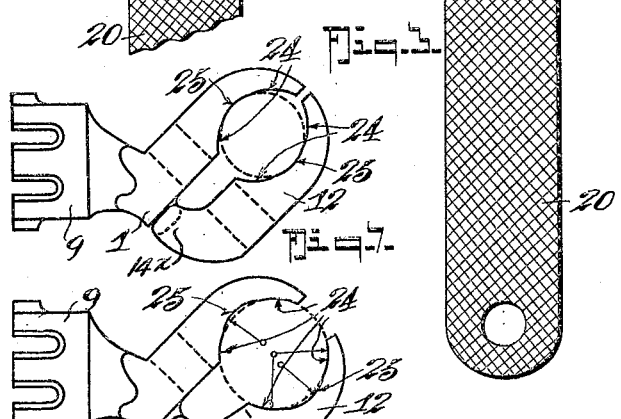
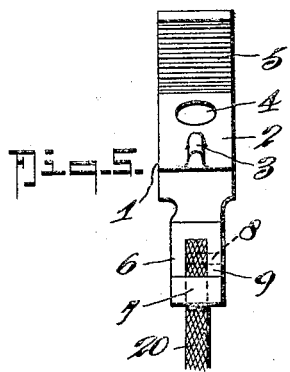
INVENTOR
Charles E. Hoover.
BY
ATTORNEY Patented Feb. 9, 1932

1,844,011

UNITED STATES PATENT OFFICE

CHARLES E. HOOVER, OF LANCASTER, PENNSYLVANIA

BATTERY TERMINAL

Application filed February 27, 1928. Serial No. 257,354.

My invention relates to the art of electrical connectors and it particularly has for its object to provide certain modifications and improvements on the battery terminal that constitutes the subject matter of my application for patent filed October 4, 1927, Serial No. 223,917.

Further it is an object of the present invention to provide a cable terminal for flat or braided ground cables.

Other objects are to provide the battery post clamping faces with gripping corrugations; to provide that part of the terminal which receives the flat cable with toothed and slotted plates between which and by which the terminal is secured to the cable, to have one of the plates bendable so as to enable the ready placing of the terminal over the end of the cable and enable the connection thereto to be made in a positive and effective way by squeezing the bendable plate toward the opposite relatively fixed plate.

Other objects will in part be obvious and in part be pointed out hereinafter.

To the attainment of the aforesaid objects and ends, the invention resides in those novel features of construction, combination and arrangement of parts, all of which will be first fully described in the following detailed description, then be particularly pointed out in the appended claims, reference being had to the accompanying drawings, in which:—

Figure 1 is a perspective view of the invention in use.

Figure 2 is a plan view of the invention.

Figure 3 is an inverted plan view of the same.

Figure 4 is a perspective view of the principal element of the connector showing the bendable plate in the "open" position.

Figure 5 is an elevation of the parts shown in Figure 4 with the flat cable in place after bending down the bendable plate.

Figure 6 is a cross section on the line 6—6 of Figure 2.

Figures 7 and 8 are diagrammatic plan views illustrating the clamp head adjusted to fit minus and plus terminals respectively.

In the drawings, in which like numerals indicate like parts in all of the figures, 1 represents the main jaw of the connector which is relatively fixed and is constituted with a flat face 2 having a male lug 3, a bolt hole 4 passing through the jaw 1, as indicated.

The jaw 1 has its gripping surface serrated as at 5 and it is provided with a relatively rigid flat plate or shank 6 which extends in a direction at an obtuse angle to the plane of the jaw's face 2.

The shank or plate 6 is provided at its extreme end with a pair of side lugs 7 and on its inner face it is provided with teeth 8. The teeth 8 are adapted to pass through apertures in the flat battery cable 20 hereinafter again referred to and project into the slots 10 in the flat bendable plate or shank 9.

The plate 9 has its slots 10 preferably chamfered as at 11 so that when the plate 9 is chamfered down onto the cable 20 with the pins 8 projected into the slots 10 the ends of the pins may be flattened or riveted over and thus lock the plate 9 in place as well as securing the cable 20 in a rigid and electrically good way.

The removable jaw 12 is provided with a bolt hole 23 similar to the bolt hole 4 and it is also provided with a serrated gripping face 13 opposing the face 5 of the other jaw.

The jaw 12 has a recess 14 formed between a pair of lugs 14x to receive loosely the lug 3 when the parts are assembled. The removable jaw 12 has a flat face 15 opposing the face 2 of the jaw 1.

The jaws are held in their gripping position by a bolt 16 whose head 17 lies against the shoulder 19 formed by the shank 6 and the jaw 1 and is thereby prevented from turning, while a nut 18 serves to draw the jaws together, in cooperation with the bolt 17.

A flat cable 20 is adapted to have the connector secured to it, as before intimated, and 21 designates the battery having the usual terminal post 22, the thing that is to be gripped by the jaws 5 and 13 constituting my invention.

As will be observed from the drawings, especially Figures 7 and 8, from which the serrations have been omitted for purposes of clear illustration, the gripping faces of the members 1 and 12 are curved on two centers to provide large or plus terminal gripping surfaces 24, and small or minus terminal gripping surfaces 25 to adapt the single gripping head for efficiently clamping on either terminal.

It will be observed that by reason of the fact that the lugs 14x and 3 have a loose engagement with one another and in view of the fact that the bolt 16 passes loosely through the bolt holes 4, the jaw 12 has a limited amount of universal movement, that is to say, it may rock on the lugs 14x to open and close the jaws, it may rock sidewise to adapt the jaws to straight or tapering posts, and it may swivel on an axis parallel to the bolt 16 to line up the corrugations of the jaws into parallelism, and it may move backwardly and forwardly to shift the centers of curvature of the jaws to accommodate irregular posts or to allow for irregularities in the casting of the jaws. My construction enables the jaws to be die cast and assembled without any machine work being done on the same, thereby cutting down the manufacturing costs considerably.

From the foregoing description, taken in connection with the accompanying drawings, it is thought the complete construction, operation and advantages of my invention will be readily understood by those skilled in the art.

What I claim is:

1. In battery cable connectors, grippers to clamp on a battery post, a shank to receive a flat cable, said shank comprising a relatively rigid plate projecting from one of said grippers and a bendable plate, said plates being adapted to receive the flat cable between them, means to secure the cable between said plates, said means comprising teeth on one plate, and recesses in the other plate into which said recesses said teeth project, the cable having holes to pass said teeth, said recesses being chamfered and said teeth being adapted to have their ends upset into the chamfered recesses.

2. In battery cable connectors, grippers to clamp on a battery post, a shank to receive a flat cable, said shank comprising a relatively rigid plate projecting from one of said grippers, and a bendable plate, said plates being adapted to receive a flat cable between them, means to secure the cable between said plates, said means comprising rigid teeth projecting from said relatively rigid plate, the cable having holes to pass said teeth, said rigid plate having ears to overlap the sides of said bendable plate and said bendable plate having slots extending normal to the line of bend of the bendable plate to slip over said teeth, said bendable plate when bent over said cable being adapted to lie parallel to said relatively rigid plate and between said ears, substantially as shown and described.

3. In battery cable connectors, grippers to clamp a battery post, a shank to receive a flat cable, said shank comprising a relatively rigid flat plate projecting from one of said grippers and a bendable plate, said relatively rigid plate having teeth and said bendable plate being slotted from one end to pass over and receive said teeth and secure a flat cable between said plates substantially as shown and described.

CHARLES E. HOOVER.